J. VAN DUSSEN REED.

FIRE-HOSE.

No. 7,443 Reissued Dec. 19, 1876

*Witnesses:*

Theodore Hoster.

B. S. Clark.

*Inventor:*

Johnson Van Dussen Reed

By J. T. Ditch his atty.

UNITED STATES PATENT OFFICE.

JOHN VAN DUSSEN REED, OF NEW YORK, N. Y.

IMPROVEMENT IN FIRE-HOSE.

Specification forming part of Letters Patent No. 161,273, dated March 23, 1875; reissue No. 7,443, dated December 19, 1876; application filed October 30, 1876.

DIVISION B.

*To all whom it may concern:*

Be it known that I, JOHN VAN DUSSEN REED, of the city of New York, county and State of New York, have invented a new and Improved Method of Fabricating Woven Hose for fire, hydraulic, or other purposes, of more than one ply, of which the following is a specification, reference being had to the accompanying drawing, forming part hereof.

My invention relates to hose for fire, hydraulic, or other purposes, composed of cotton, linen, or other analogous materials; and consists in the method of fabricating the same, herein described, wherein the warp-threads are arranged and held in a cylindrical or equivalent form, while two or more woof-threads are interwound with the said warp-threads in concentric coils, one within another, the warp-threads being thrown as described, whereby the whole is tied together and forms a single cylindrical tubular web of more than one ply.

In order that those skilled in the art may be able to practice my improved method in the fabrication of hose, whether of two, three, or more plies, I will describe the same; also, a loom by which such hose may be made in pursuance of my method.

On the 4th day of June, 1872, Letters Patent of the United States were reissued to me for improvement in looms for weaving hats. By the said loom, with certain modifications, changes, and additions, my new method may be practiced. The general description of that loom I shall not here repeat, but refer to the said patent of June 4, 1872, for the same, confining my present description to the changes, modifications, and additions necessary for the fabrication of hose in accordance with my new method.

Figure 4:
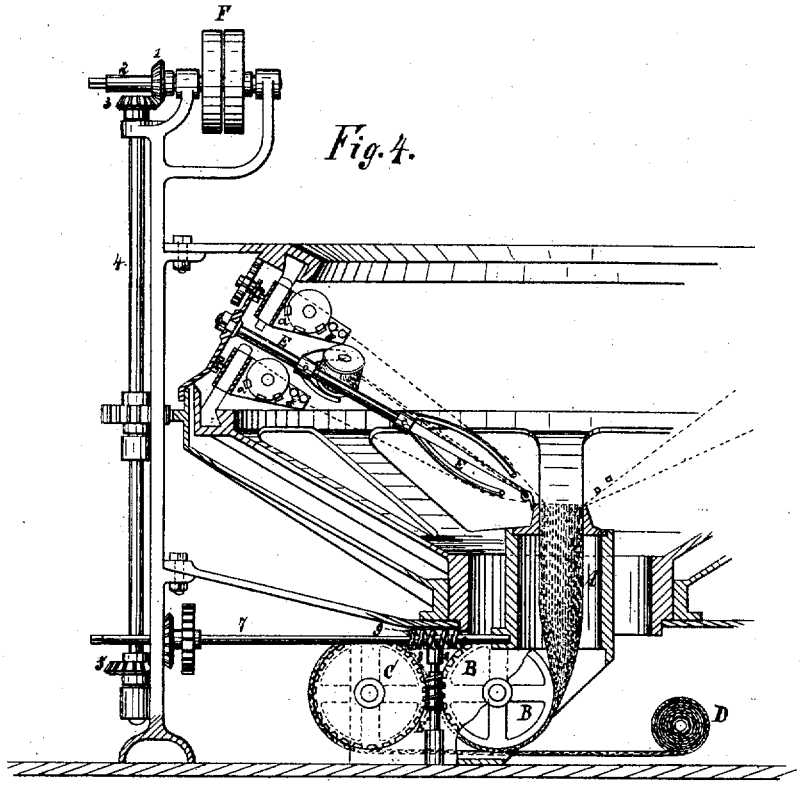

In order that these changes, modifications, and additions may be the more readily understood, I have reproduced here, in Fig. 4 of the drawings, a sectional view of the parts of the said loom by which the warp strands or threads are carried and held, and the several woof-threads delivered and wound into the web, and packed therein.

In this loom the warp-strands are held on spools carried by jacks arranged around a circle, the strands converging toward the center of the circle, where they pass down through a hollow cylinder over the upper circular edge of the said cylinder. Just at this edge the woof-strands are woven into the warp by a shuttle, which is carried around the circle and winds the woof into the web spirally, thus forming a continuous cylindrical tube. The ends of the warp-threads, before the operation of weaving in the woof is commenced, are gathered together, carried down through the cylinder A, Fig. 4, around under the drum B, over the drum C, and back around a drum or axle, D. By a stress of a weight or spring upon the axle D the proper tension is given to the warp-threads. Upon the shafts *e e'* of the drums B C are gears, which are driven by the worm E', to which motion is communicated from the driving-pulley F, through the shaft and gears 1 2 3 4 5 6 7, and the worm and gear 8 and 9. The warp-carriers or jacks *a* are held between vertical guide plates or partitions, and are caused to move up and down in their places between said guide-plates by the harness, to give the requisite motion to the warp-strands in the act of weaving, the shuttle being carried in the end of the arm E, which is attached to the frame carrying the harness, and revolves with it, thus winding the said woof-thread into the web spirally and continuously, from end to end of the hose, all of which, as far as relates to the action of the woof-carriers and shuttle, is fully described in the Letters Patent before referred to.

Now, to produce a double-ply web a second shuttle and shuttle-carrying arm are provided, the said arm being attached to the revolving carriage or rings of the loom, the two arms being placed at opposite sides of the loom, each shuttle carrying a separate woof-thread. A certain number of the jacks or warp-carriers are made to carry the warp-threads to form one of the ply, and an equal number to carry those to form the other ply. The warp-threads for each web are thrown by their carriers, to form with the woof-thread delivered from the shuttles, respectively, a separate web, and then the two webs are tied together into one by another set of warp-threads, which cross through both webs, back and forth around the two woof-threads, the jacks carrying these tying-threads being, by the direction of the guide-rings of the harness which actuate them, made to thus pass back and forth through the entire thickness of both webs. Usually, about every fourth warp-strand is made such tying-strand. A greater or less number may be used at pleasure.

Figure 1:
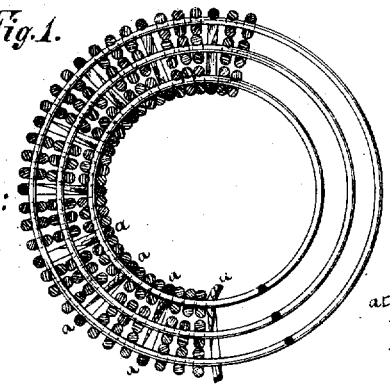
Figure 2:
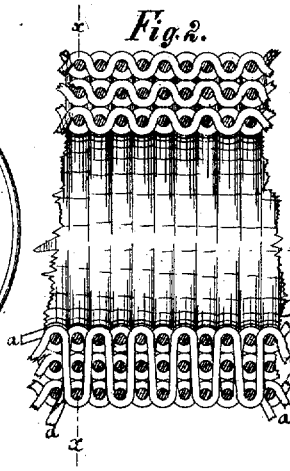

The operation described will produce a fabric the relative position and direction of the several threads of which are represented by Figs. 1 and 2, the former being a cross-section of hose, and the latter a longitudinal section. These drawings are made on a greatly-enlarged scale, and the strands or threads are represented as separated widely from each other, in order that their relative position and direction may be plainly seen.

In the actual web the strands are, of course, crowded into close contact with each other. To do this I attach at essentially right angles to the end of the shuttle-carrying arm a divider, consisting of two arms, *e e*, formed into an oblate frame. The shuttle travels between the arms of the divider, and delivers the weft evenly and closely between the warp-strands, which are forced apart in its passage, and these warp-strands, being closed after the passage of the divider, tie the weft up solidly and firmly, and it is further compacted by the next passage of the shuttle and divider.

Figure 3:
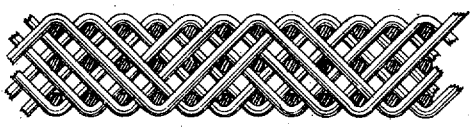

To make a three-ply hose, (the one represented in the drawing,) it is only necessary to add a third shuttle and shuttle-carrier, divide the warp-threads into three sets—one for each web—and construct and arrange the harness to throw the carriers of the several sets to weave with the three-woof strands three separate webs, and then to cause the tying-strands to pass through the three webs and around all the three woof-threads, or to cause all the warp-threads to cross and recross through the web and around all the woof-threads, as seen in Fig. 3.

The drawing, Figs. 1, 2, and 3, represents several sections of a three-ply hose, in the fabrication of which my improved method was employed, Figure 1 being a cross-section, and Fig. 2 a longitudinal section, of the same. Fig. 3 is also a longitudinal section, showing a web in which each and all the warp-threads pass back and forth through the entire thickness of the web.

In Fig. 1 the large circles represent the woof-threads of a three-ply hose, and the small circles the ends of the warp-threads. Each woof-thread and its adjacent warp-threads constitute in fact a distinct web, and then the three webs are tied together by certain strands *a* of the warp, (represented by full lines in Figs. 2 and 3,) which pass through the web from face to face, between and crossing the woof-threads.

I do not intend to limit myself to the precise arrangement of the threads here shown. One variation is shown in Fig. 3. To vary the construction of the hose it is only necessary to so construct and arrange the harness of the loom as to move the warp-carriers to give the warp-thread the necessary motions, which any mechanic or weaver skilled in the art will know how to do.

As will be observed, the peculiarity of the method of fabricating hose herein described is, that in the weaving the warp-threads, at the actual point of weaving, are held in an expanded or circular position, precisely as the hose will be when under internal pressure, and that while held there the two or more woof threads are interwound with the warp-threads in helical coils—one coil within another—and the whole fabric tied together and completed while in this position, thus forming an expanded woven tube of uniform strength and appearance around its whole periphery, and obviously without the weakness of a hose, which, woven originally flat, is expanded when submitted to internal pressure, as above described.

What I claim as my invention, and desire to secure by Letters Patent, is—

The method herein described of fabricating woven fire or hydraulic hose of more than one ply, of cotton, linen, or other analogous material, by arranging and holding the warp-strands in a cylindrical or equivalent form, while two or more woof-strands are, without any sharp or short bends, interwound and packed with them in concentric helical coils, one within another, the warp-threads being shed, as described, whereby the whole are tied together to form a single cylindrical tubular web of uniform strength and appearance throughout, substantially as specified.

Witness my hand this 25th day of October, 1876.

JOHN VAN DUSSEN REED.

Witnesses:

WM. T. FARNHAM,

B. G. CLARK.